United States Patent
Sharon

(10) Patent No.: US 10,750,903 B2
(45) Date of Patent: Aug. 25, 2020

(54) BAKING TOASTER APPARATUS AND METHOD

(71) Applicant: Life Project Israel Ltd., Savyon (IL)

(72) Inventor: Tomer Sharon, Savyon (IL)

(73) Assignee: Life Project Israel Ltd., Savyon (IL)

( * ) Notice: Subject to any disclaimer, the term of this patent is extended or adjusted under 35 U.S.C. 154(b) by 0 days.

(21) Appl. No.: 15/413,440

(22) Filed: Jan. 24, 2017

(65) Prior Publication Data

US 2017/0208994 A1 Jul. 27, 2017

Related U.S. Application Data

(60) Provisional application No. 62/286,376, filed on Jan. 24, 2016.

(51) Int. Cl.
A47J 37/06 (2006.01)
A47J 36/32 (2006.01)

(52) U.S. Cl.
CPC .......... *A47J 37/0611* (2013.01); *A47J 36/32* (2013.01)

(58) Field of Classification Search
CPC .................................. A47J 37/0611
USPC .................................. 99/372–384
See application file for complete search history.

(56) References Cited

U.S. PATENT DOCUMENTS

| 3,696,734 A * | 10/1972 | Beasley ............ A47J 37/0611 |
| | | 219/525 |
| 4,065,658 A | 12/1977 | Keim |
| 5,138,938 A | 8/1992 | McClean |
| 6,050,176 A * | 4/2000 | Schultheis ............ H05B 3/74 |
| | | 126/39 K |
| 6,425,319 B1 * | 7/2002 | Wu .......................... A47J 27/62 |
| | | 99/332 |
| 6,484,623 B1 | 11/2002 | Yoon et al. |
| 7,472,644 B2 | 1/2009 | Friel |
| 7,963,215 B2 | 6/2011 | Hoe et al. |
| 2002/0002910 A1 | 1/2002 | Chan et al. |
| 2002/0088793 A1 * | 7/2002 | Siu ..................... A47J 37/0611 |
| | | 219/450.1 |
| 2004/0159648 A1 | 8/2004 | Trojian |
| 2004/0217109 A1 * | 11/2004 | Chang ............... A47J 37/0611 |
| | | 219/525 |
| 2005/0005777 A1 * | 1/2005 | Steinberg ........... A47J 37/0611 |
| | | 99/349 |
| 2005/0247210 A1 * | 11/2005 | Ragan ................ A47J 37/0611 |
| | | 99/372 |

(Continued)

*Primary Examiner* — Ibrahime S Abraham
*Assistant Examiner* — John J Norton
(74) *Attorney, Agent, or Firm* — Mark M. Friedman

(57) ABSTRACT

A baking toaster for providing baked items, the baking toaster having a liftable upper housing section and a lower housing section, wherein the liftable upper housing section is closable against the lower housing section. A pair of interchangeable baking pans are each seated in the lower and upper housing sections, and are releasable from the baking toaster via a latching mechanism. At least one heating element is disposed in at least one of the upper and lower housing sections, and there is a timer mechanism for enabling a user to pre-set a baking cycle for a specific amount of time, which automatically shuts off the heating element at the end of the pre-set baking cycle, for the convenience of the user and for providing safety against overheating of the baking toaster, thereby also preventing burning of the baked items.

18 Claims, 12 Drawing Sheets

(56) References Cited

U.S. PATENT DOCUMENTS

| | | | |
|---|---|---|---|
| 2006/0201333 A1* | 9/2006 | Friel, Sr. | A47J 37/0611 99/372 |
| 2006/0249506 A1* | 11/2006 | Robertson | A47J 37/0611 219/450.1 |
| 2008/0116193 A1* | 5/2008 | Lam | A47J 37/0611 219/450.1 |
| 2011/0250332 A1* | 10/2011 | Geissler | A47J 31/20 426/435 |
| 2012/0152126 A1* | 6/2012 | Robinson | A47J 37/0611 99/331 |
| 2015/0164274 A1* | 6/2015 | Jinzhao | A47J 37/015 99/372 |

\* cited by examiner

VIEW D-D

BAKING TOASTER APPARATUS AND METHOD

FIELD OF THE INVENTION

The present invention relates generally to small appliance toasters, and more particularly to toasters used for baking.

BACKGROUND OF THE INVENTION

Sandwich toasters are well known, and can be found in many households and food establishments. The toasters are very convenient; they are portable, light and easy to use and they are faster than using a toaster oven. In recent years appliances were made which resemble a sandwich toaster but are used for baking cakes. These products bake waffles, muffins, donuts etc., quickly, but require constant supervision because the user does not know by looking at the cover of the appliance when the cake is ready. Furthermore, these appliances can become hazardous once they are turned on for long periods of time, because they become over-heated.

The compact size of this type of appliance dictates that its construction be well-suited to high heat temperatures applied directly to its interior surfaces, with exterior housing materials designed to withstand these heat levels and allow safe operation and handling of external parts such as the cover which opens to allow insertion of baking material, and control devices mounted on the cover.

Timer controllers are well-known in the art, and are typically provided by low-cost mechanical devices which operate on a spring provided as a thin elongated metal band wound in a flat coil configuration. These are based on a mainspring which uses a spiral torsion spring of metal ribbon—commonly spring steel, wound in a spiral. The winding mechanism uses a ratchet and pawl arrangement to prevent the spring from unwinding. When the spring is wound, thereby winding the flat coil with stored energy, this device automatically unwinds itself in accordance with a mechanically driven gear, to provide constant torque so that its release of spring energy can be controlled in accordance with a desired time cycle. Kitchen timers are typically based on these type of devices.

A problem with the use of these types of kitchen timers is the mainspring metal ribbon is subject to metal fatigue, which would tend to make it break or perform with reduced accuracy. Temperature is a factor in the proper operation of these devices, and excess temperatures can cause thermal distortion of the mainspring coil.

Due to the high heat levels of interior portions of the baking toaster appliances, it has not been considered possible to apply mainspring timer controllers to these appliances, as their operation would be adversely affected. Generally therefore, no low-cost mechanical timer controllers are available on these appliances and the problems associated with over/underbaking due to lack of supervision and control remain.

However, there are known small cooking appliances that do have a timer, such as a pizza maker. The pizza maker is distinguishable from a baking toaster, since the former has a round metal body which is not covered by an insulating housing. The body, as a result, is too hot for the touch when the appliance is operated, therefore it has a plastic handle for lifting and closing the cover. The timer is placed on the rear end of the plastic handle, because the handle is the only place on the pizza maker that a timer can function. On any other surface area of the pizza maker, a timer would become overheated and will malfunction. Because of its metal body, a pizza maker has less heat build-up internally, since the metal body enables heat dissipation to the external surrounding air.

Therefore, it would be desirable to overcome the disadvantages of prior art relating to baking toaster operation, due to lack of supervision and control.

SUMMARY OF THE INVENTION

Accordingly, it is a principal object of the present invention to overcome the limitations of prior art baking toasters by providing a baking toaster featuring a durable, portable, light weight, compact, efficient and easily operated baking toaster design that bakes various types of baking items, and is controlled by a timer.

In accordance with a preferred embodiment of the present invention, there is provided a baking toaster for providing baked items, said baking toaster comprising:

a liftable upper housing section;

a lower housing section, wherein said liftable upper housing section is closable against said lower housing section;

a pair of interchangeable baking pans, each seated in one of said lower and upper housing sections, wherein said interchangeable baking pans are releasable from said baking toaster via a latching mechanism;

at least one heating element disposed in at least one of said upper and lower housing sections; and a timer mechanism, enabling a user to pre-set a baking cycle for a specific amount of time, wherein said timer mechanism automatically shuts off said at least one heating element at the end of said pre-set baking cycle, for the convenience of the user and for providing safety against overheating of said baking toaster, thereby also preventing burning of the baked items.

The inventive baking toaster of the preferred embodiment provides an automatic shut-off timer, that announces when the baked item is ready and also controls the baking cycle and shuts off the toaster to avoid burning of the baked item. The timer and automatic shut-off of the present invention also provides safety against potential burning of the baking toaster in the case that the user accidently leaves the toaster unattended for a long while.

According to an additional preferred embodiment of the present invention, there are provided interchangeable baking pans, so that different types of baking goods may be baked, such as waffles, muffins, donuts, etc. Each type of baking goods needs a different amount of time for it to be baked, therefore the timer will be set to a different time interval with every different baking pan that is used. Therefore, the timer function is important to the interchangeability function of the baking pans.

According to another preferred embodiment of the present invention, the baking toaster is provided with a power switch to be turned on and off, and a light to indicate the timer is turned on and the toaster is heating. A second light is provided to indicate that the toaster is hot enough and is ready for the baking batter to be poured into it.

According to a preferred embodiment of the present invention, there is provided a durable, portable, light weight, compact, efficient and easily operated baking toaster that bakes various types of baking items. There is provided a unique design, with an elevated upper section for providing internal volume within which is located the timer and associated electrical circuitry. Raising the timer location and placing it in a location spaced apart from the heating element, as well as placement of an insulator between the timer and the heating element, achieves sufficient heat protection for enabling heat dissipation without affecting the operation of the timer mechanism. The timer is located in relative isolation from the heating element.

Additional features and advantages will become apparent from the following drawings and description.

BRIEF DESCRIPTION OF THE DRAWINGS

For a better understanding of the invention with regard to the embodiments thereof, reference is made to the accompanying drawings, in which like numerals designate corresponding elements or sections throughout, and in which.

DETAILED DESCRIPTION OF THE PREFERRED EMBODIMENTS

It is a principal object of the present invention to provide a durable, portable, light weight, compact, efficient and easily operated baking toaster that bakes various types of baking items with a timer.

Figure 1:
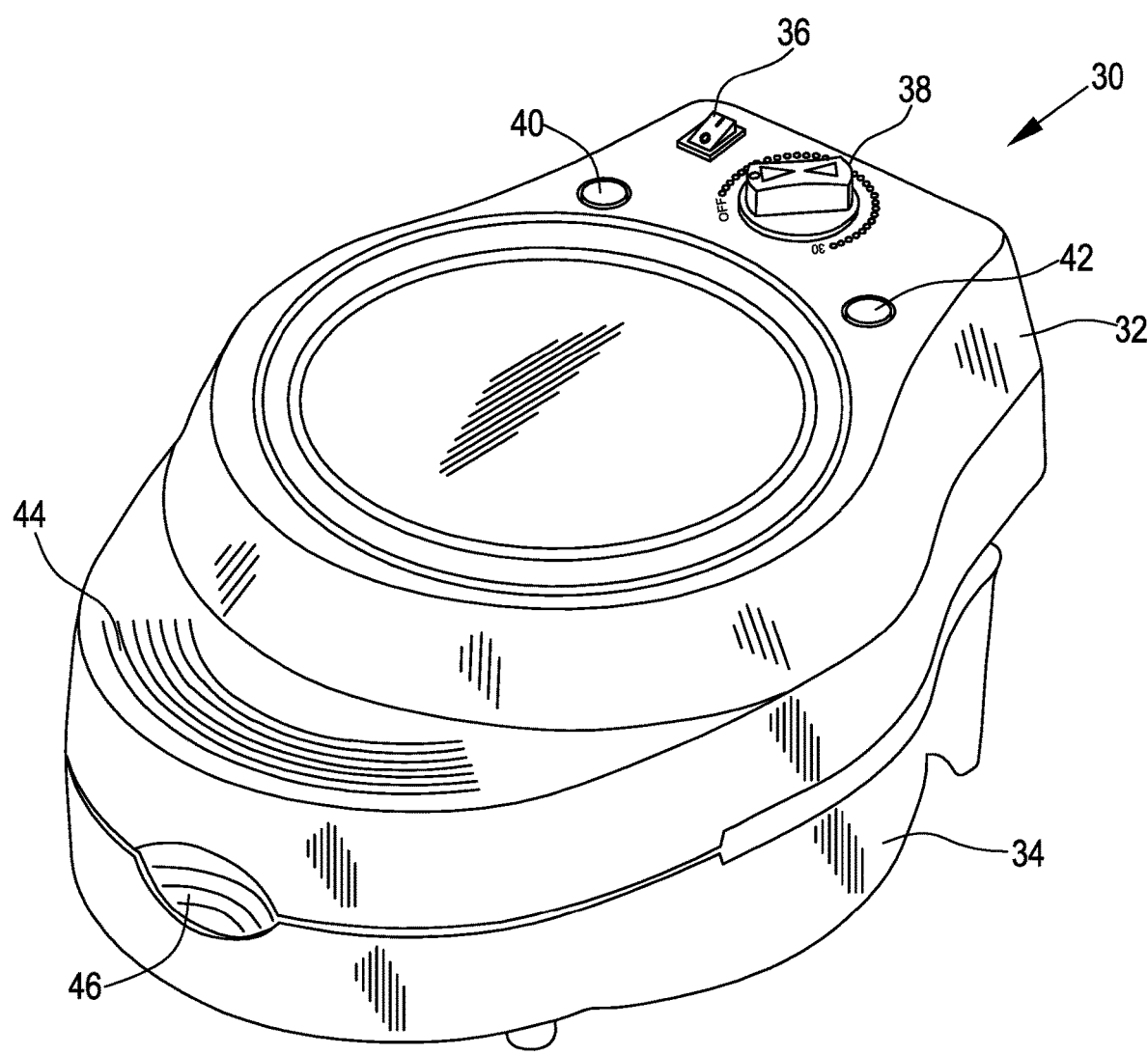
FIG. 1 shows a front perspective view of a baking toaster according to a preferred embodiment of the present invention.

Referring now to FIG. 1, there is shown a baking toaster 30 in a closed position, having a liftable upper housing section 32 and a lower housing section 34. Upper housing section 32 has located on its surface a power switch 36 and timer knob 38. Lights 40 and 42 are positioned near power switch 36 one on each side of timer 38. Ridges 44 for easy grasping are formed on upper housing section 32, and ridges 44 are also formed on depressions 48a-b for easy grasping when changing baking pans 50a-b (see FIGS. 2-3, described herein below). As described further herein, baking toaster 30 is useful to quickly bake waffles, muffins, donuts etc., using baking pans 50a-b enclosed with the baking toaster 30.

In a typical baking cycle, when using baking toaster 30, power switch 36 is switched on and then timer knob 38 is turned to the desired baking time interval. Once timer knob 38 is rotated, toaster 30 starts to heat and green light 40 is lit for indication purposes. After approx. three minutes, red light 42 is lit indicating that toaster 30 is hot and ready for the cake batter to be poured into pan 50a (shown in FIGS. 2-3). Once the pre-set time interval has elapsed, a bell 79 (shown in FIG. 7B) rings and baking toaster 30 automatically shuts off. The timer has a very crucial function, because existing baking toasters have no timer, so that the user needs to stay near the baking toaster and constantly check when the baked item is ready and to make sure it does not burn. The baking toaster 30 of the present invention has a timer that controls the baking cycle and also announces when the baked item is ready and shuts off the toaster to avoid burning of the baked item.

The timer and automatic shut-off of the present invention also provides a safety feature against potential burning of baking toaster 30 in the case that the user accidently leaves the toaster unattended for a long while.

In a preferred embodiment, upper and lower housing sections 32, 34 are fabricated from Bakelite material, which provides safe handling and heat insulation.

Figure 2:
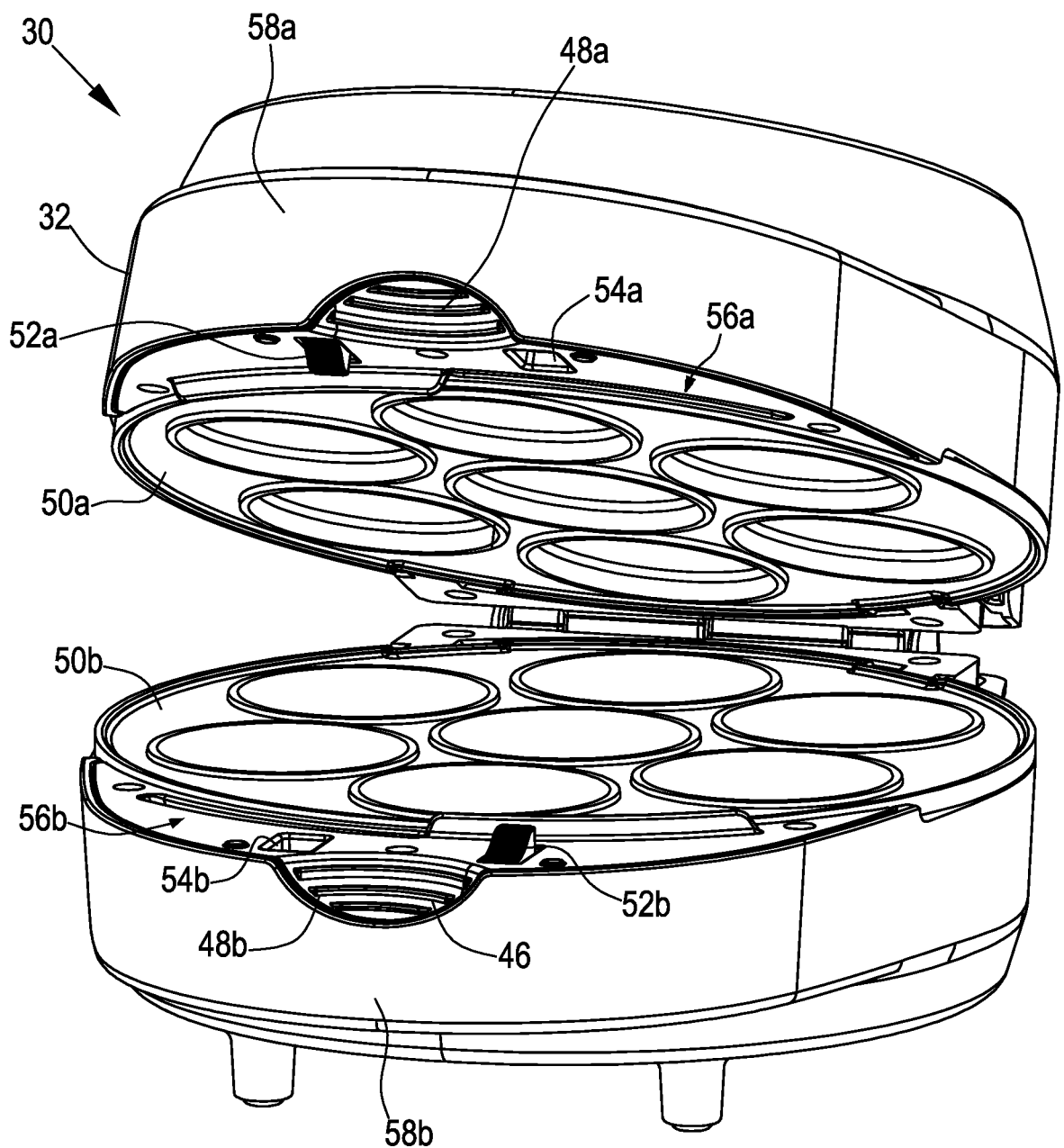
FIG. 2 shows a perspective view of the baking toaster of FIG. 1, in a partially open position.

Referring now to FIG. 2, there is shown a perspective view of baking toaster 30 in a partially open position. Upper housing section 32 is lifted by grasping depression 48a on its front. Depression 48a is formed with ridges 44 formed upon it for easy grasping. Interchangeable top and bottom pans 50a-b are each seated in one of upper section 32 and lower section 34, respectively. Push buttons 52a-b are positioned on latch mechanism mounting plates 56a-b which are positioned on front portions 58a-b of upper and lower housing sections 32-34, respectively. Indentations 54a-b each corresponding to one of push buttons 52a-b, are also positioned oppositely on latch mechanism mounting plates 56a-b, respectively. When upper and lower housing sections 32, 34 are closed together, indentations 54a-b receive the oppositely located push buttons 52a-b.

Unlike sandwich toasters, baking toaster 30 does not have a latch for closing upper section 32 tightly against lower section 34, thus enabling the baked items to rise inside pans 50a-b, and slightly lift upper section 32. Additionally, the absence of a latch provides a safety feature by eliminating the risk of generating too much concentrated heat within baking toaster 30.

Figure 3:
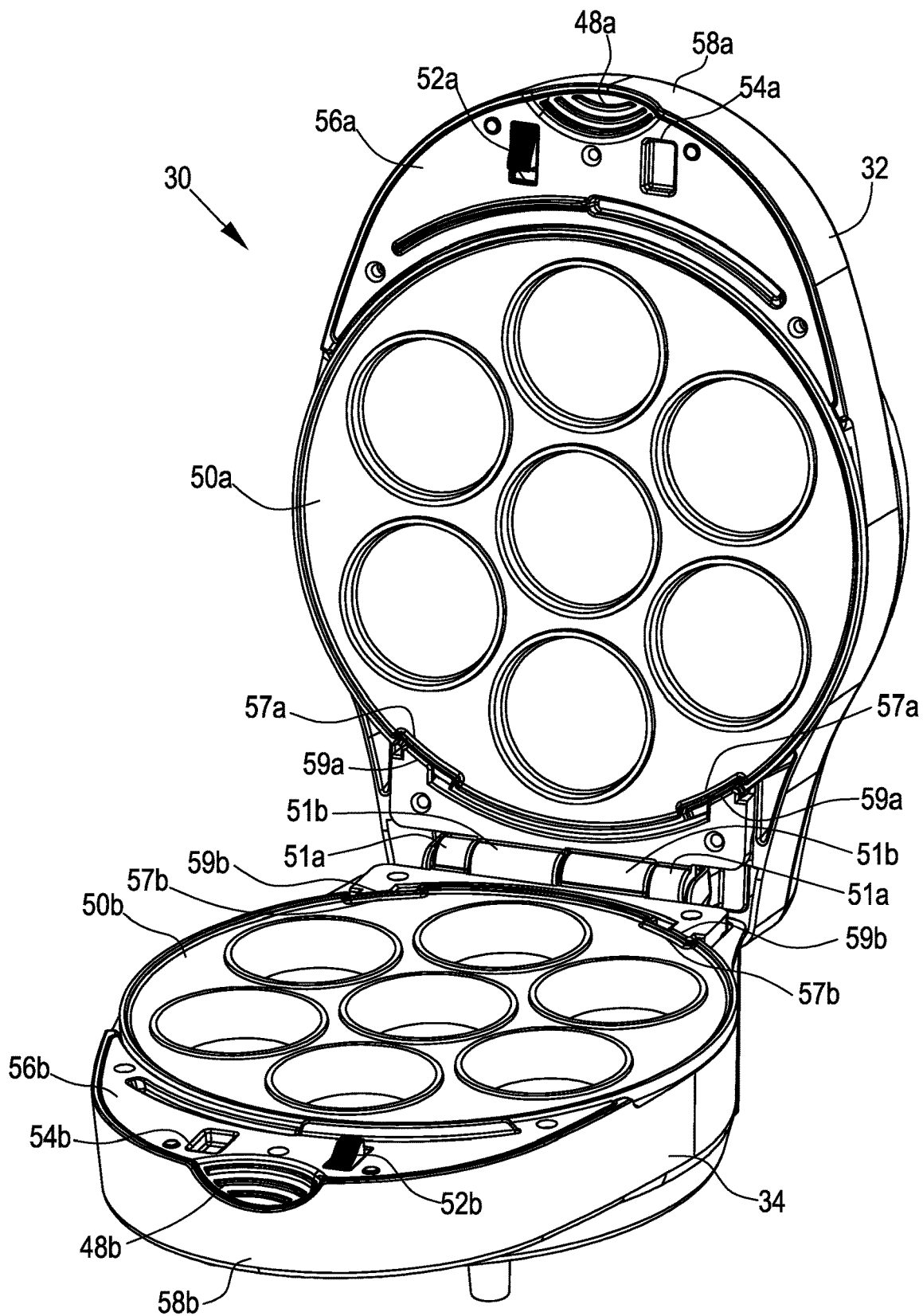
FIG. 3 shows the baking toaster of FIG. 2 in a fully open position.

Referring now to FIG. 3 there is shown baking toaster 30 in a fully open position. Baking pans 50a-b are interchangeable so that different kinds of cakes can be baked in baking toaster 30. In FIG. 3 there are shown pans 50a-b for baking muffins. A baking pan 50 for baking waffles or a baking pan 50 for baking donuts are also provided (not shown), or any other pan for baking various baked items.

Figure 7:
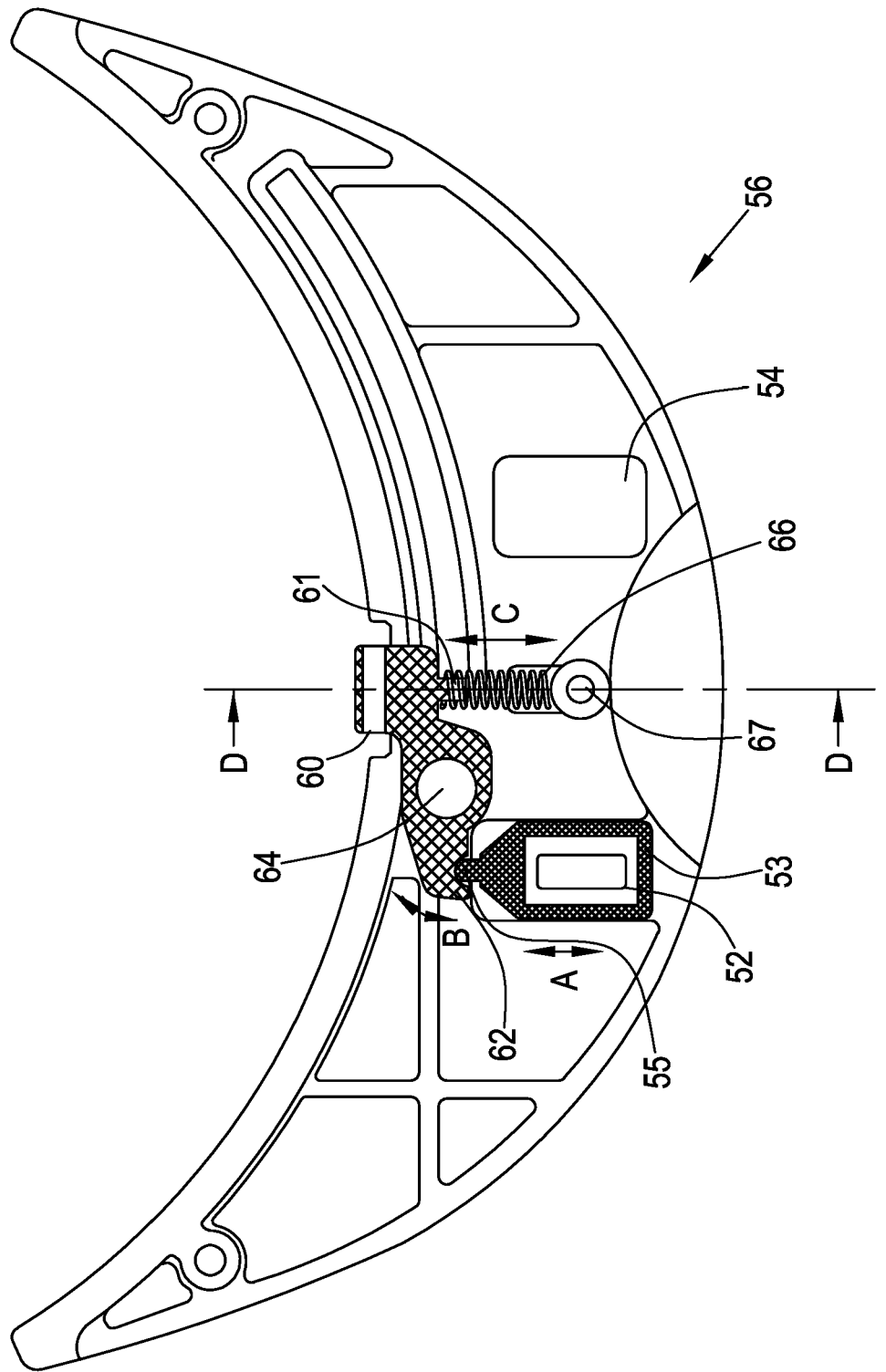
FIG. 7 shows a bottom view of a latching mechanism mounting plate as part of a preferred embodiment of the present invention.

Baking pan 50 is seated in baking toaster 30 but can be removed from baking toaster 30 by releasing it via a latching mechanism (shown in FIG. 7).

Upper housing section 32 is lifted and lowered over lower housing section 34 by hinged rotational movement, by interleaved sections 51a and 51b, each integrally formed, respectively, with one of upper section 32 and lower section 34.

Figure 4:
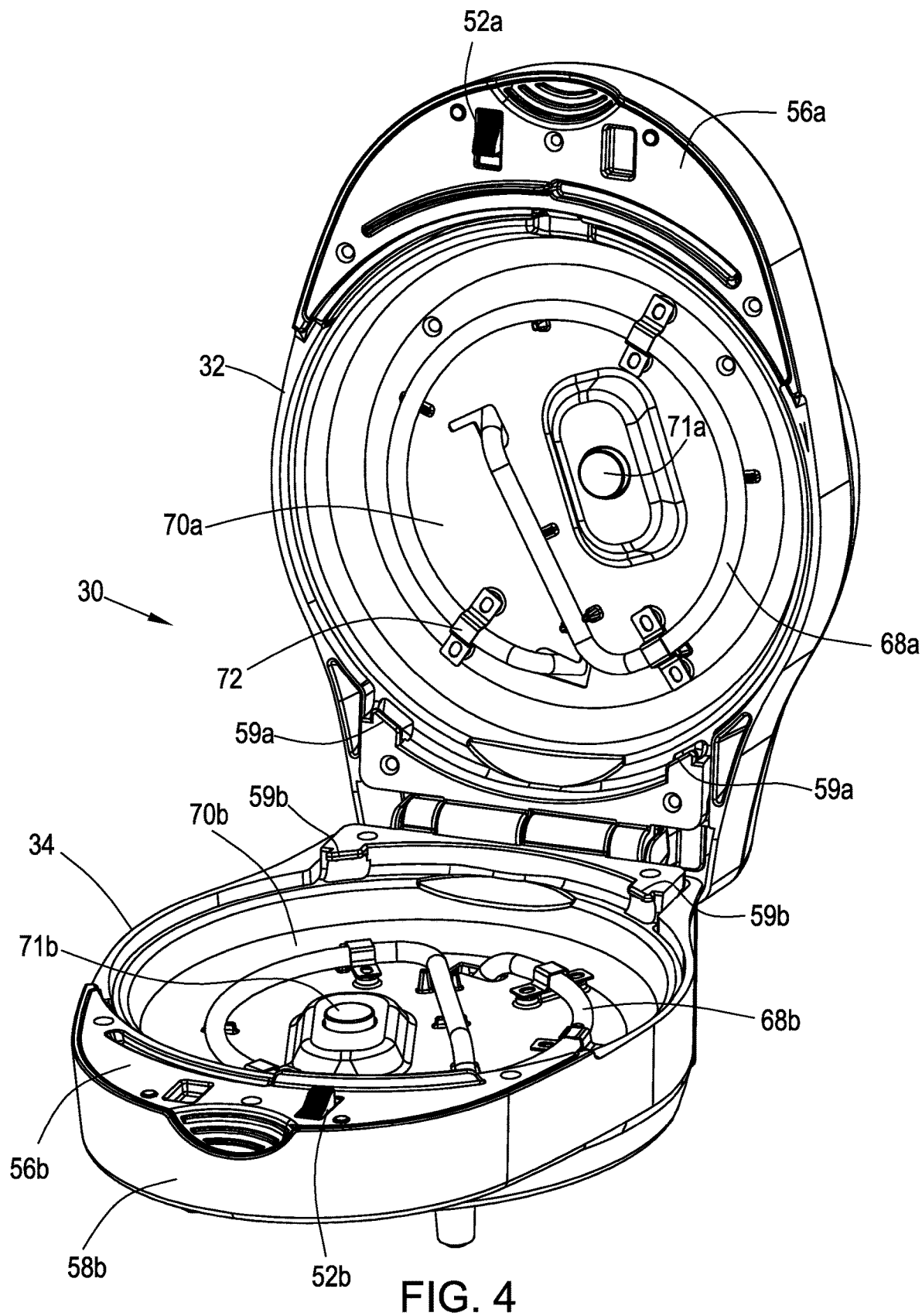
FIG. 4 shows the baking toaster of FIG. 3 without baking pans.

Referring now to FIG. 4, there is shown baking toaster 30 without baking pans 50a-b. Heating elements 68a-b are retained by upper and lower heating cover plates 70a-b, respectively, using brackets 72. Heating elements 68a-b are connected to a power supply and are capable of developing 900 watts of concentrated heat, and reach approx. 160-190 degrees Celsius. When heating elements 68a-b reach 180-190 degrees Celsius, overheat protector T1 (see FIG. 9) shuts off the heating for preventing baking toaster 30 from over-heating.

Baking pans 50a-b (not shown here) are seated between heating cover plates 70a-b. Heating elements 68a-b provide direct heating to pans 50a-b via direct contact with heating cover plates 70a-b. The position of heating elements 68a-b on heating cover plates 70a-b provides uniform heating throughout the entire surface of baking pans 50a-b.

Ejector 71a-b is a spring-loaded button which is pressed down by pan 50 when inserted into upper and lower sections 32, 34. When pan 50 is inserted and pressed down, a click is heard when tab 63 engages latching mechanism (see FIGS. 7 and 8A-B). When releasing pan 50 from section 32, 34, ejector 71a-b pops up thereby elevating pan 50 so that it can be easily pulled out of baking toaster 30.

Figure 5:
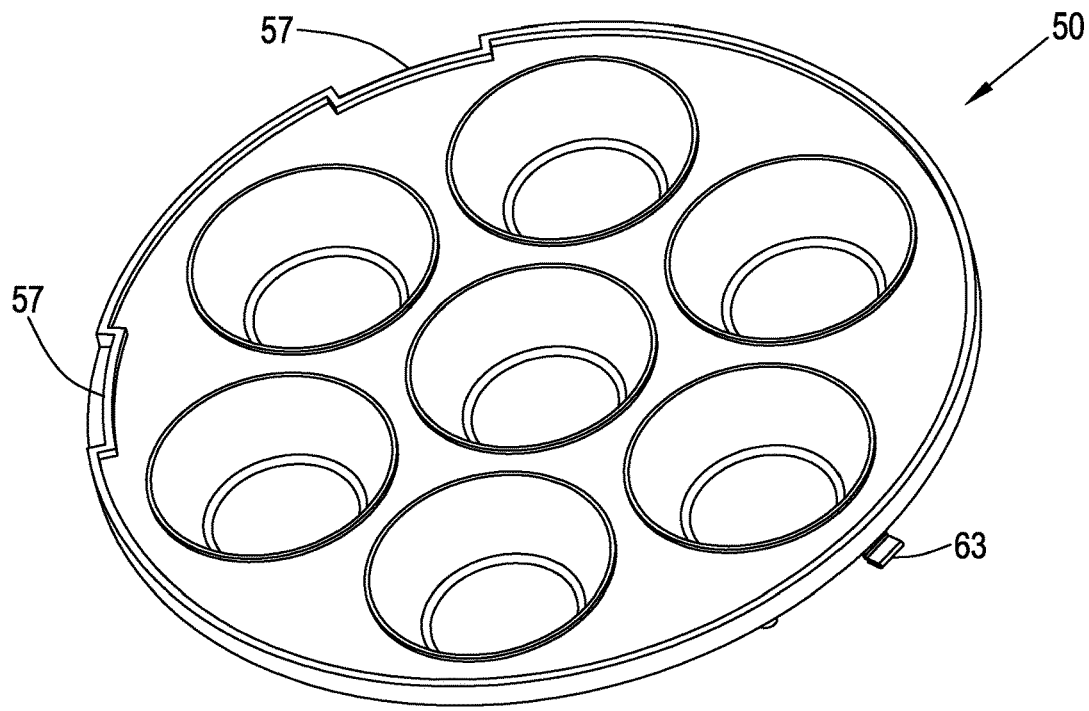
FIG. 5 shows a top perspective view of a baking pan.

Referring now to FIG. 5, there is shown a top perspective view of pan 50 which is for inserting into upper 32 and lower 34 sections of baking toaster 30. Pan 50 has a tab 63 positioned on the outer edge of the bottom of pan 50 which is retained by a latching mechanism (shown in FIG. 7), for latching pan 50 securely into baking toaster 30, so that pan 50 does not wobble. Because the baking batter is poured into pan 50 when it is already inside baking toaster 30 (for pre-heating), it is important that pan 50 sit securely in lower section 34 so that the batter does not spill.

An indentation 57 is formed on two locations on the outer edge of pan 50. Indentation 57 accommodates shoulder 59 (shown in FIGS. 3-4) of lower and upper sections 32, 34. Indentation 57 ensures that pan 50 is inserted into baking toaster 30 in the correct direction, so that heating element channel 82 (shown in FIG. 6) is directly over heating element 68.

Figure 6:
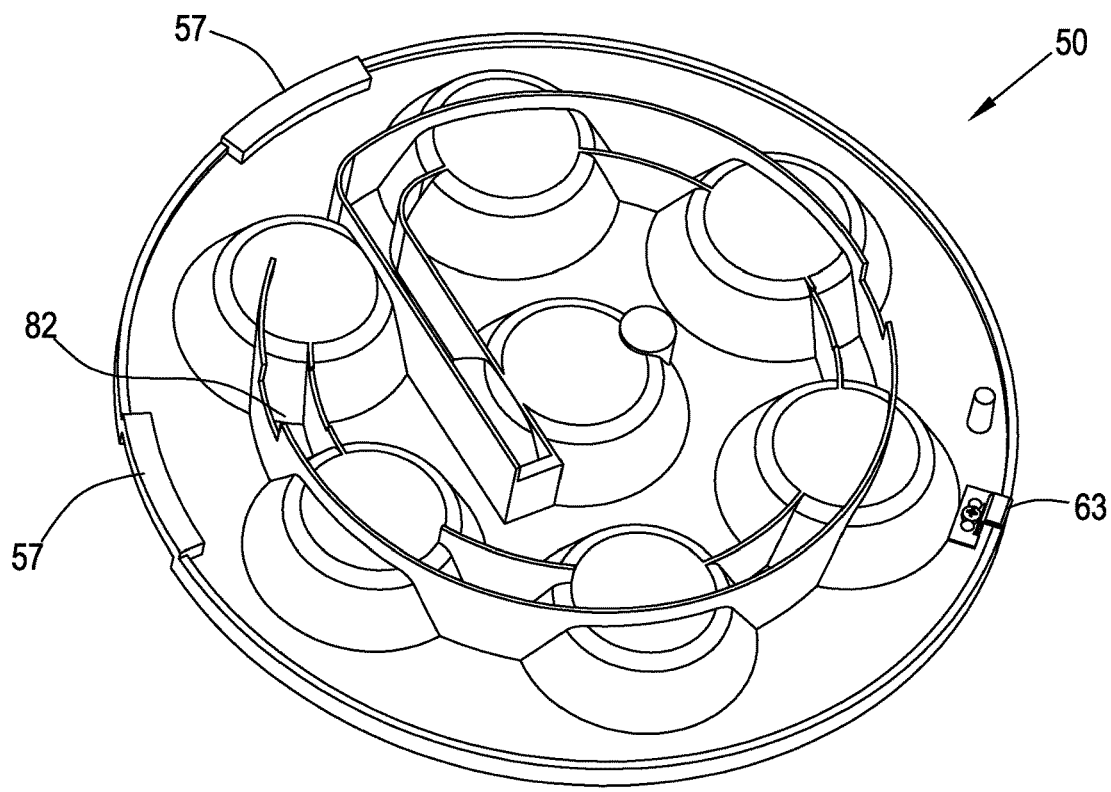
FIG. 6 shows a bottom perspective view of a baking pan.

Referring now to FIG. 6, there is shown a bottom perspective view of pan 50, showing heating element channel 82. Heating element 68a or 68b is fitted into channel 82 when inserting pan 50 into one of upper 32/lower 34 sections, for the purpose of ensuring close contact of pan 50 with heating element 68a or 68b for achieving uniform heat throughout entire pan 50.

Referring now to FIG. 7 there is shown a bottom view of the latching mechanism, associated with each of upper and lower sections 32, 34. The latching mechanism comprises mounting plate 56 (a or b), push button 52, pivotable latch 60 and spring 66. Push button 52 is surrounded by frame 53 having a protrusion 55 engaging notch 62 formed on one end of pivotable latch 60.

When push button 52 is pushed forward, frame 53 is moved accordingly (arrow A), thereby pushing protrusion 55 against notch 62. This causes latch 60 to pivot (arrow B) about cylindrical post 64 which extends vertically from plate 56. When latch 60 pivots, it retracts (arrow C), thereby enabling lifting of one of baking pans 50a-b from its seated position so that it can be taken out of baking toaster 30. Spring 66 is wrapped around spring anchor 61 on another end of latch 60 and post 67 provides a spring stop so that spring 66 does not move any further. Upon release of push button 52 all the above return to their original position (arrows A, B and C indicate bi-directional motion).

Figure 8A:
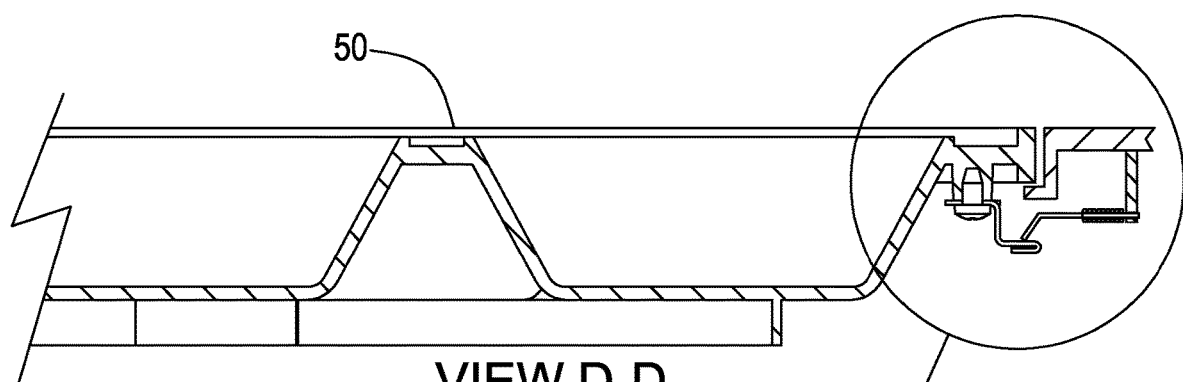
FIGS. 8A-B shows a cross-sectional view of the latching mechanism of FIG. 7.

Referring now to FIG. 8A, there is shown a cross-sectional view of the latching mechanism taken along section line D-D of FIG. 7.

Figure 8B:
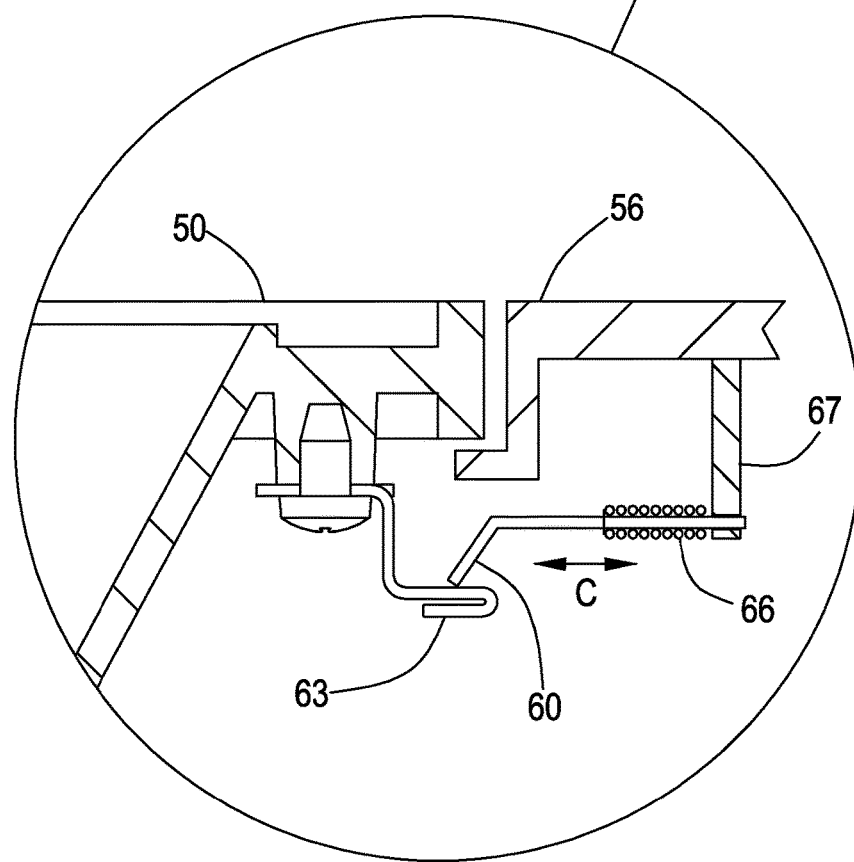

Referring now to FIG. 8B, there is shown an enlargement of cross section D-D.

When push button 50 is pushed forward, latch 60 which retains tab 63, retracts, thereby releasing tab 63 and pan 50 is released so that it does not press upon ejector 71, thereby allowing ejector 71 to pop up and thereby elevate pan 50 so that it can be easily pulled out of baking toaster 30.

Figure 9:
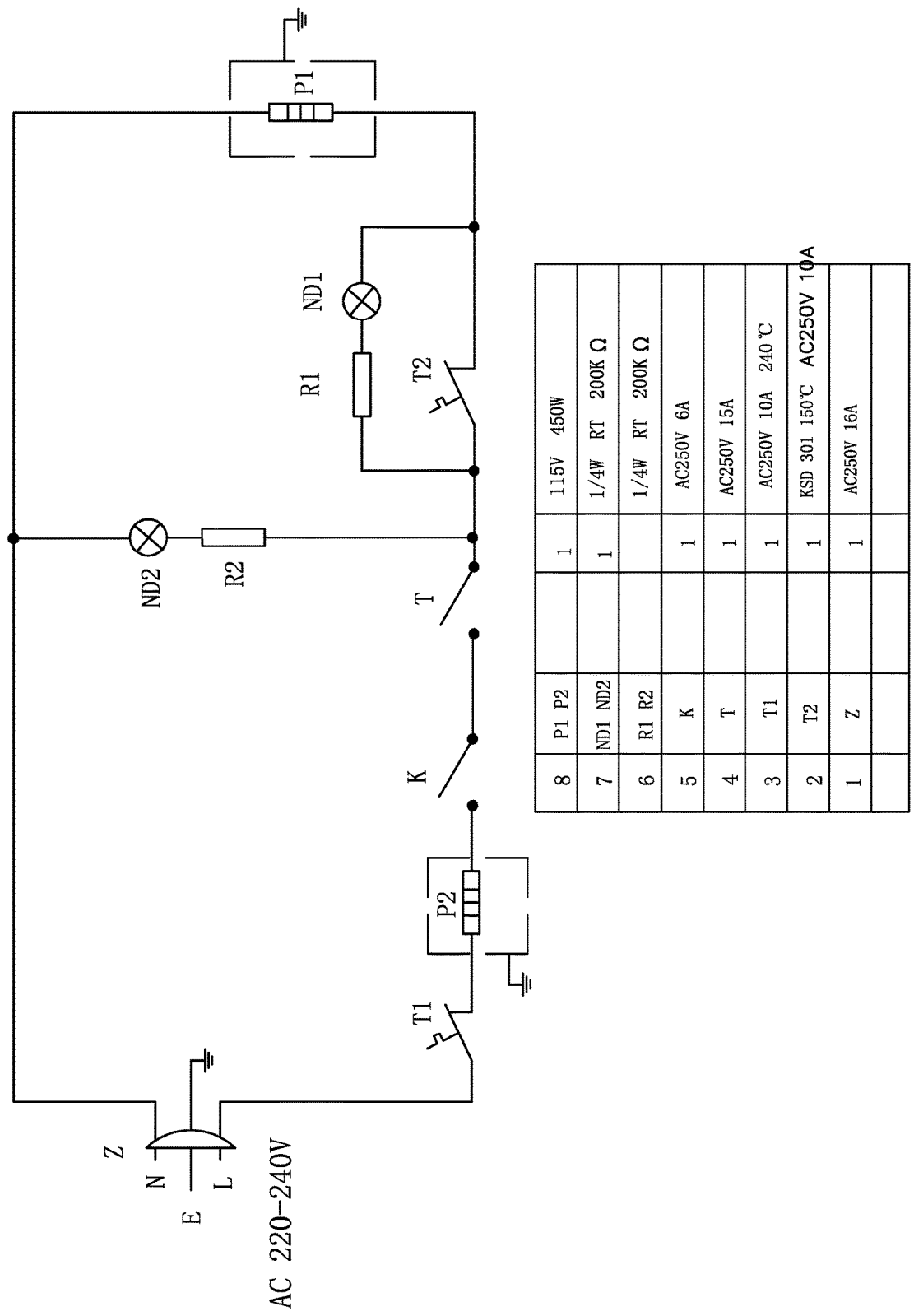
FIG. 9 shows an electrical circuit schematic diagram of a heating and control circuitry associated with baking toaster of FIG. 1.

Referring now to FIG. 9, there is shown an electrical circuit schematic diagram of the heating and control circuitry associated with baking toaster 30. As shown, the circuit proposes a design based on an AC power input voltage of 220-240V. The electrical design features two heating elements P1 (68a) and P2 (68b). Heating element P2 is protected by overheat protector T1, providing a safety feature. Heating element P2 is connected in series with the main electrical on/off power switch K (36), and also in series connection with the timer T (timer mechanism 78, see FIG. 10B). Indicator light ND2 corresponds to green light 40 of FIG. 1, to provide visual indication that the toaster 30 has been turned on and the timer has been pre-set to a particular baking cycle, having a predetermined baking time interval.

When the timer has been pre-set, power is applied to heating elements P1 and P2 (68a-b) which begin to develop heat. The thermostat T2, which has a normally closed set of contacts, is arranged in parallel with indicator light ND1 which corresponds to red light 42 in FIG. 1. The normally closed set of contacts does not allow a voltage to be developed across indicator light ND1. However, when sufficient heat has been developed by heating elements P1 and P2, the thermostat T2 operates so that its thermally sensitive sensor element opens its set of contacts, thereby placing voltage across indicator light ND1 so that it glows. This provides visual indication that sufficient heat has been developed for the baking batter to be poured into baking toaster 30.

Figure 10A:
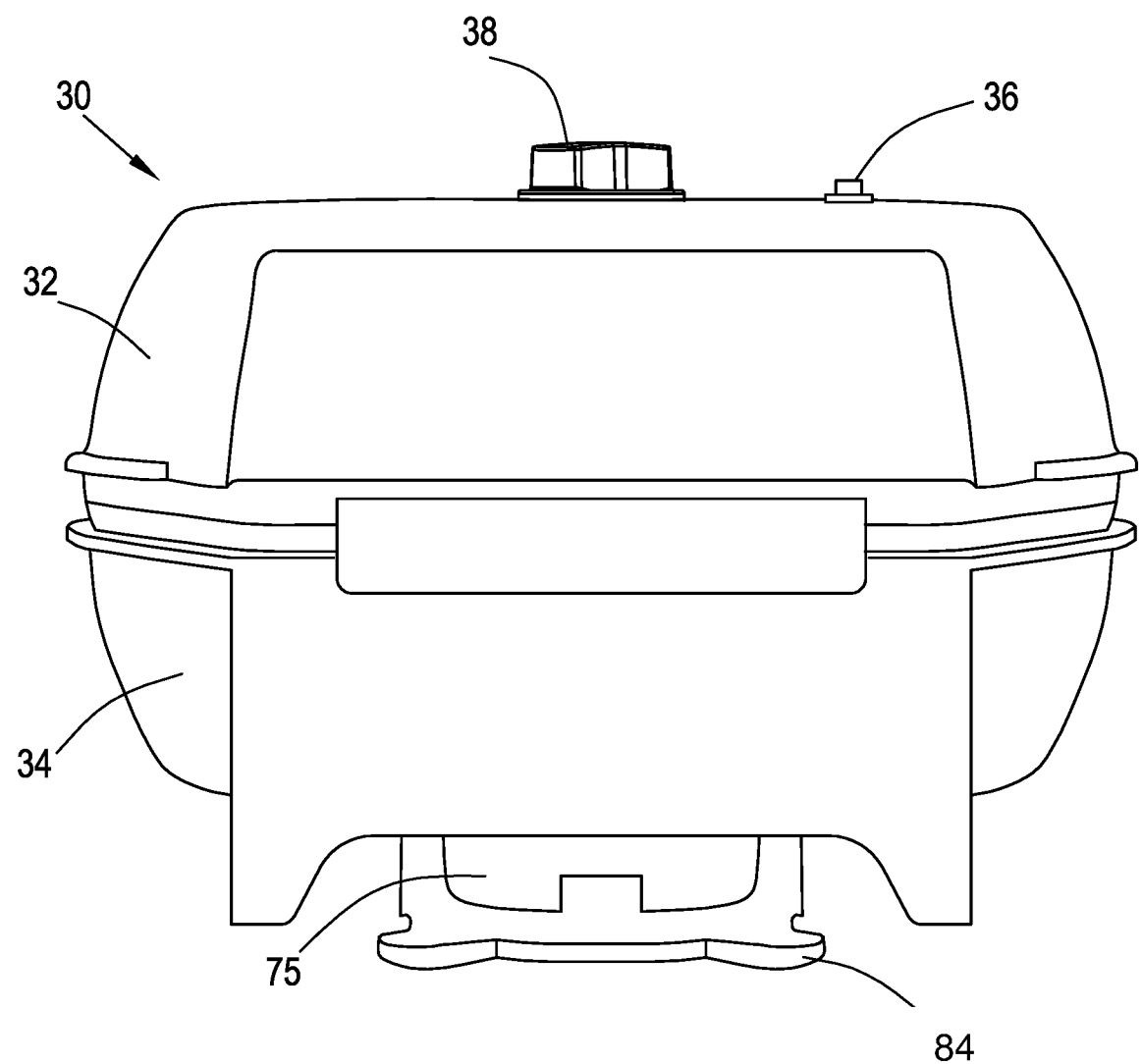
FIGS. 10A-C show a rear view of the baking toaster.
Figure 10B:
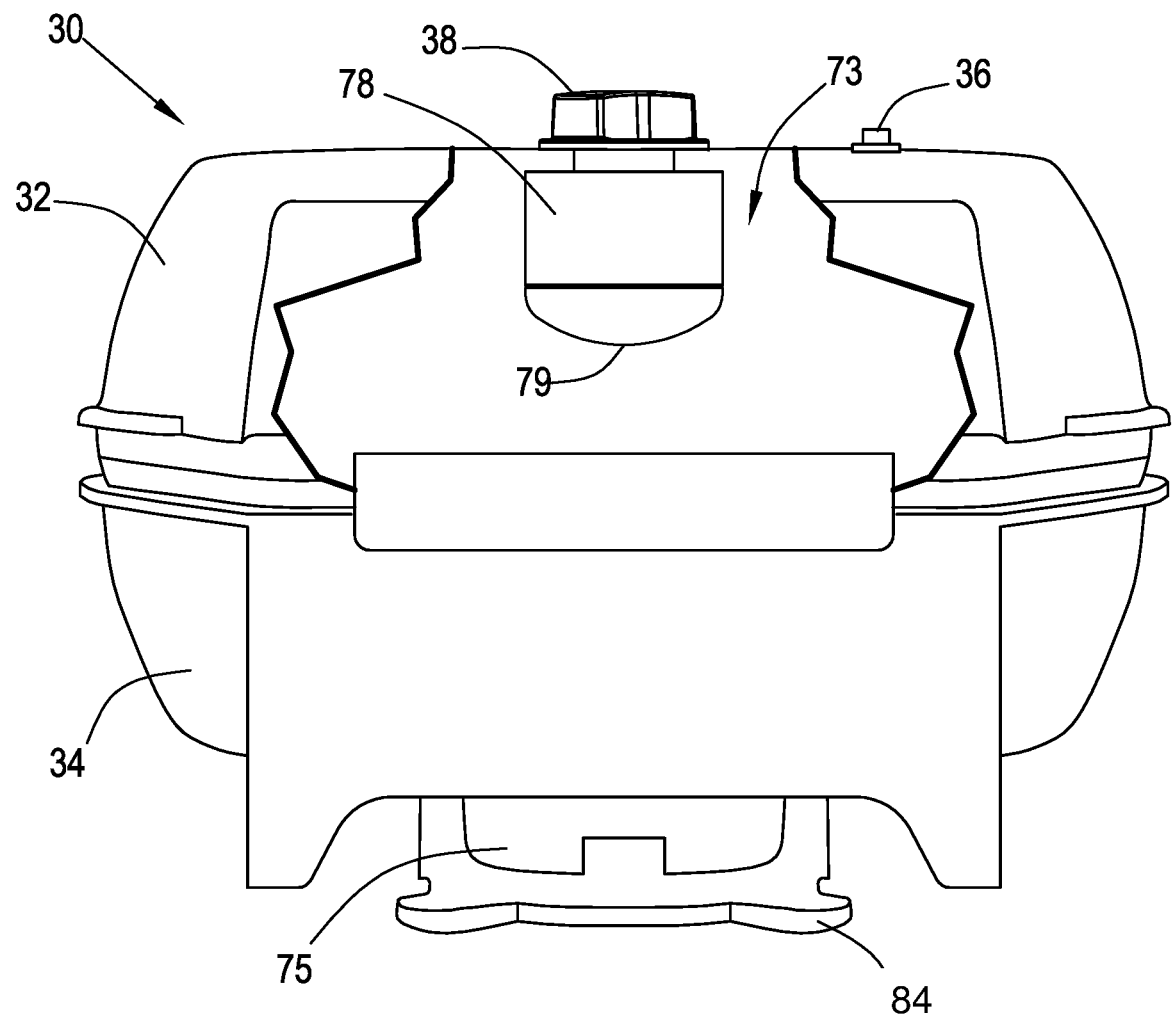
Figure 10C:
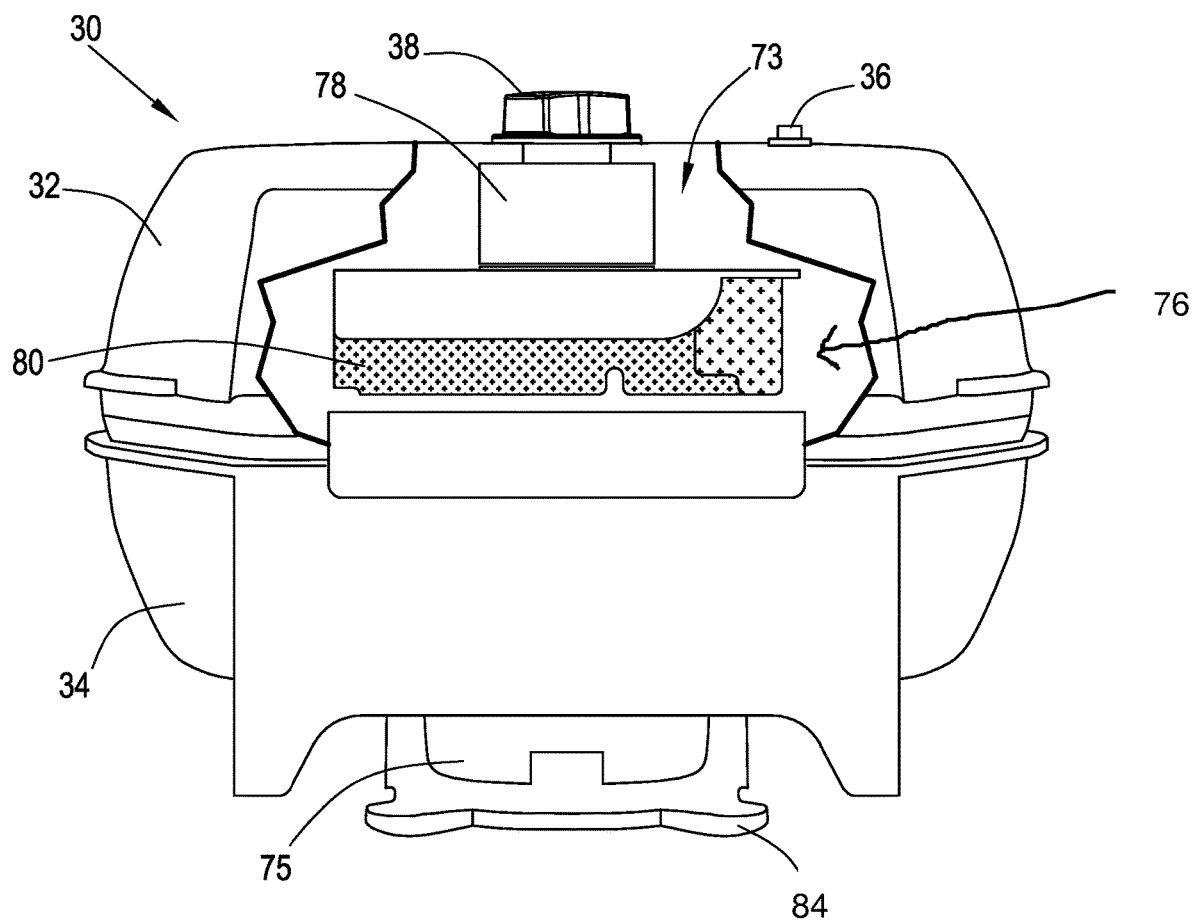

Referring now to FIGS. 10A-C there is shown a rear view of baking toaster 30. In FIG. 10A, timer knob 38 is shown situated on top of upper housing section 32, near power switch 36. Beneath base 75 of toaster 30 is power-cord supporter 84, for wrapping the power cord (not shown) around it, for convenience and for avoiding cord entanglement.

In FIG. 10B there is shown a partial cutaway of a rear view of upper housing section 32 revealing an interior compartment 73 in which there is located timer mechanism 78 and the associated electrical circuitry. The timer mechanism 78 is situated beneath and connected to timer knob 38. Timer bell 79 is positioned beneath timer mechanism 78. Timer bell 79 rings when the pre-set time interval on timer mechanism 78 has elapsed, for notifying the user that the baked item is ready. Heating cover plate 70a (see FIG. 4) is directly below interior compartment 73.

Figure 11:
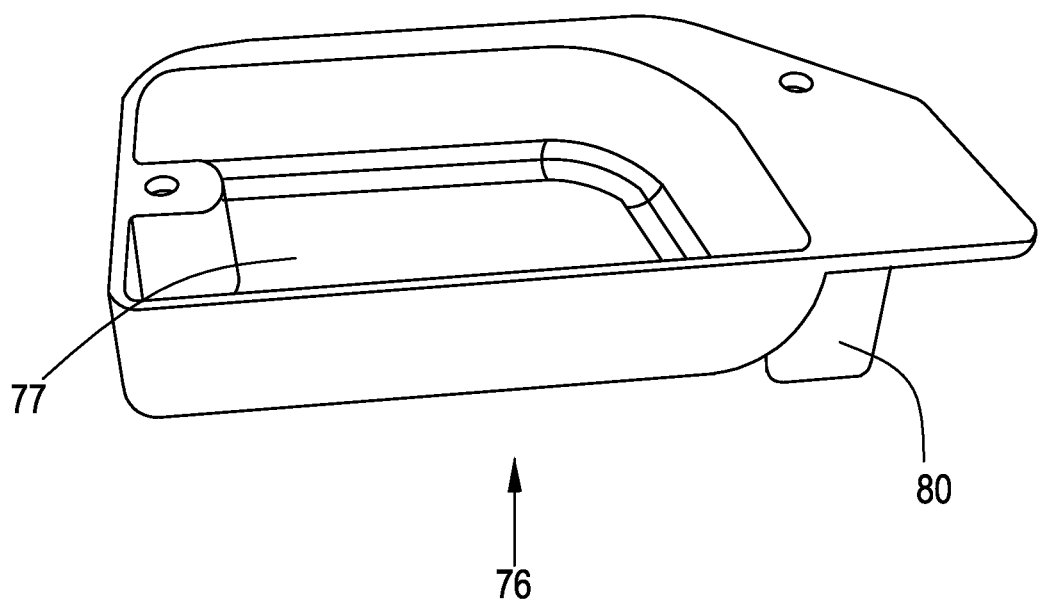
FIG. 11 shows a heat insulator for the timer.

In FIG. 10C there is shown the partial cutaway of FIG. 10B, showing fitted heat insulator 76 (see FIG. 11). The close proximity of timer mechanism 78 above heating cover plate 70a, places it at risk of getting over-heated and eventually malfunctioning, typically due to metal fatigue of the flat coil spring (not shown), per the background section of this specification. Fitted heat insulator 76 is provided to insulate timer mechanism 78, and thus protect it from the heat generated by heating element 68a, and transmitted via heating cover plate 70a. Fitted heat insulator 76 is typically made of PPS plastic (polyphenylenesulfide) and is positioned beneath timer mechanism 78, such that timer bell 79 is seated within the oblong-shaped cavity 77 of heat insulator 76. Heat insulator 76 can be provided with additional heat insulation material. Heat insulator 76 has an insulator wall 80 positioned vertically beneath cavity 77 to provide support. By virtue of the location of heat insulator 76, the timer mechanism 78 is maintained in relative isolation from the heating element 68a, thereby preventing thermal effects from disturbing its operation.

Although particular embodiments of the invention have been described and illustrated herein, it is recognized that modifications and variations may readily occur to those skilled in the art and consequently, it is intended that the claims be interpreted to cover such modifications and equivalents.

I claim:

1. A baking toaster for providing baked items, said baking toaster comprising:
   a liftable upper housing section including a heating element, having a rearward interior compartment;

a lower housing section, wherein said liftable upper housing section is closable against said lower housing section;

a pair of interchangeable baking pans, each seated in one of said lower and upper housing sections, wherein said interchangeable baking pans are releasable from said baking toaster via a latching mechanism; and, an automatic shut-off timer mechanism placed within said interior compartment and having a flush-mounted knob protruding above said upper housing section said automatic shut-off timer mechanism is in communication with a timer bell positioned within said interior compartment, wherein said timer mechanism automatically shuts off said at least one heating element at the end of said pre-set baking cycle, for the convenience of the user and for providing safety against overheating of said baking toaster, thereby also preventing burning of the baked items, wherein said interior compartment has a heat insulator made of PPS (polyphenylenesulfide) plastic, formed as a shaped cavity disposed between said heating element of said upper housing section, and said automatic shut-off timer mechanism, such that said timer bell is seated within the shaped cavity of said heat insulator, thereby isolating and protecting said automatic shut-off timer mechanism from thermal disturbances which may interfere with its operation.

2. The baking toaster of claim 1, wherein during said pre-set baking cycle, baking batter which has been poured into said interchangeable baking pan seated in said lower housing section, rises into said interchangeable baking pan seated in said upper housing section and thereby raising said upper section, providing the baked items.

3. The baking toaster of claim 1, wherein said pair of interchangeable baking pans comprise various different types, each for baking a different type of baked item.

4. The baking toaster of claim 1, wherein said toaster further comprises an on/off power switch.

5. The baking toaster of claim 1, wherein said toaster further comprises a light which is turned on once said timer is set, and said light is turned off once the baking cycle has ended and said timer is done.

6. The baking toaster of claim 1, wherein said toaster further comprises a second light for indicating when said baking toaster is heated and ready for a baking batter to be poured into said lower interchangeable baking pan.

7. The baking toaster of claim 1, wherein said timer mechanism comprises a turntable knob for setting said timer to a desired baking time interval.

8. The baking toaster of claim 1, wherein said upper and lower housing sections are fabricated from Bakelite material which provides safe handling and heat insulation.

9. The baking toaster of claim 1, wherein said upper and lower housing sections each comprises a front portion, wherein each said front portion comprises a depression formed with ridges for easy grasping, and wherein said upper housing section is lifted by grasping said depression.

10. The baking toaster of claim 9, wherein said latching mechanism is provided in each of said upper and lower housing sections to retain said baking pans therein, each said latching mechanism comprising:

a mounting plate, positioned on said front portion of said housing section;

a latch pivotably mounted on said mounting plate, said pivotable latch having a latch portion formed at one end thereof and a notch formed at the other end thereof;

a retention spring, providing a spring force to retain said latch portion in position over a tab extending from below an outer edge of said baking pan; and a push button slidably mounted on said mounting plate, and being arranged to engage said notch, wherein said pivotable latch, when operated by said push button, pivots against said spring force so as to retract said latch portion, thereby releasing said baking pan and enabling lifting thereof from its seated position so that it can be removed from the baking toaster.

11. The latching mechanism of claim 10, wherein once said push button is pushed, said interchangeable baking pan is released from said housing section and may be replaced by a different type of said interchangeable baking pan.

12. The baking toaster of claim 10, wherein each of said upper and lower sections further comprise an ejector, wherein said ejector is pressed down by said pan when said pan is inserted into said upper and lower sections and a click is heard, and wherein when said pan is released by said latching mechanism, said ejector pops up whereby elevating said pan so that it can be easily pulled out of said baking toaster.

13. The baking toaster of claim 10, wherein said baking pan comprises an outer edge, and the bottom of said outer edge comprises a tab which engages said pivotable latch portion when said pan is inserted into said upper and lower sections, thereby securely positioning said pan into said baking toaster so that said pan does not wobble and the baking batter does not spill.

14. The baking toaster of claim 13, wherein said outer edge further comprises at least one indentation which accommodates at least one shoulder formed on each of said lower and upper housing sections, for the purpose of secure and correct insertion of said baking pan into said section in a correct direction.

15. The baking toaster of claim 1, further comprising heat insulation material wherein said heating elements are capable of developing up to 900 watts of concentrated heat, and reach a temperature of up to 190 degrees Celsius, and wherein said heat insulator or said heat insulation material protect the operation of said timer mechanism.

16. The baking toaster of claim 12, wherein when said heating element reaches a temperature of 190 degrees, an overheat protector shuts off said heating element for preventing overheating of said baking toaster.

17. The baking toaster of claim 1, wherein said at least one heating element is retained by respective upper or lower heating cover plates, and said heating elements provide direct heating to said pair of interchangeable baking pans via direct contact with said heating elements.

18. The baking toaster of claim 1, wherein said interchangeable baking pan comprises on its bottom side a heating element channel shaped to have said heating element inserted therein, so that said heating element is in close contact with said baking pan for achieving uniform heat throughout said entire pan.

* * * * *